United States Patent [19]
Curtindale

[11] Patent Number: 6,003,928
[45] Date of Patent: Dec. 21, 1999

[54] INTERIOR TRIM ATTACHMENT APPARATUS FOR AN AUTOMOTIVE VEHICLE

[75] Inventor: Edward G. Curtindale, Farmington Hills, Mich.

[73] Assignee: Lear Automotive Dearborn, Inc., Southfield, Mich.

[21] Appl. No.: 08/943,302

[22] Filed: Oct. 14, 1997

[51] Int. Cl.$^6$ .................................................... B60J 3/00
[52] U.S. Cl. .......................... 296/97.9; 296/214; 362/490
[58] Field of Search ................... 296/97.9, 97.1, 296/214; 248/27.3; 362/488, 490, 546

[56] References Cited

U.S. PATENT DOCUMENTS

| | | |
|---|---|---|
| 2,596,873 | 5/1952 | Solmes . |
| 3,514,010 | 5/1970 | Rossi ..................................... 220/293 |
| 4,148,519 | 4/1979 | Hollar, Jr. . |
| 4,178,035 | 12/1979 | Cziptschirsch . |
| 4,352,518 | 10/1982 | Prince et al. . |
| 4,529,157 | 7/1985 | Suman et al. . |
| 4,553,797 | 11/1985 | Marcus . |
| 4,569,552 | 2/1986 | Marks . |
| 4,634,196 | 1/1987 | Nestell . |
| 4,729,590 | 3/1988 | Adams . |
| 4,818,013 | 4/1989 | Van Order . |
| 4,819,134 | 4/1989 | Rossi ..................................... 362/183 X |
| 4,844,533 | 7/1989 | Dowd et al. . |
| 4,866,579 | 9/1989 | Miller et al. . |
| 4,893,866 | 1/1990 | Dowd et al. . |
| 4,893,867 | 1/1990 | Hillborn et al. . |
| 4,902,068 | 2/1990 | Dowd et al. . |
| 4,913,484 | 4/1990 | Dowd et al. . |
| 4,981,322 | 1/1991 | Dowd et al. . |
| 4,989,911 | 2/1991 | Van Order . |
| 5,011,218 | 4/1991 | Danner et al. . |
| 5,031,953 | 7/1991 | Miller . |
| 5,031,954 | 7/1991 | Peterson et al. . |
| 5,056,853 | 10/1991 | Van Order . |
| 5,061,005 | 10/1991 | Van Order et al. . |
| 5,062,608 | 11/1991 | Phelps et al. . |
| 5,082,322 | 1/1992 | Cekander et al. . |
| 5,082,323 | 1/1992 | Dowd et al. . |
| 5,098,151 | 3/1992 | Peterson . |
| 5,137,072 | 8/1992 | Traspadini . |
| 5,186,517 | 2/1993 | Gilmore et al. . |
| 5,201,564 | 4/1993 | Price . |
| 5,239,449 | 8/1993 | Wunk et al. . |
| 5,242,204 | 9/1993 | Kitterman et al. . |
| 5,269,060 | 12/1993 | Dowd et al. . |
| 5,314,227 | 5/1994 | Weiland et al. . |
| 5,331,525 | 7/1994 | Lawassani et al. . |
| 5,357,408 | 10/1994 | Lecznar et al. . |
| 5,366,127 | 11/1994 | Heinz . |
| 5,374,097 | 12/1994 | George et al. . |
| 5,417,466 | 5/1995 | Giantonio et al. . |
| 5,451,022 | 9/1995 | Peterson ............................ 296/97.9 X |
| 5,465,199 | 11/1995 | Bray et al. . |
| 5,470,123 | 11/1995 | Snyder . |
| 5,499,854 | 3/1996 | Crotty, III et al. . |
| 5,544,927 | 8/1996 | Snyder et al. . |
| 5,544,928 | 8/1996 | Mori et al. . |
| 5,560,669 | 10/1996 | Gute . |
| 5,632,061 | 5/1997 | Smith et al. . |

FOREIGN PATENT DOCUMENTS

| | | | |
|---|---|---|---|
| 0248240 | 12/1987 | European Pat. Off. | ............... 296/214 |
| 2 630 060 | 10/1988 | France . | |

OTHER PUBLICATIONS

PCT/EPO International Search Report for PCT/US 98/09055.

Smoke Detector Description (prior to May 1997), Exhibit B.

Exhibit A, Drawing of Four–Slide, Inc. sun visor clip (prior to May 1997).

Primary Examiner—D. Glenn Dayoan
Assistant Examiner—Jason Morrow
Attorney, Agent, or Firm—Harness, Dickey & Pierce, P.L.C.

[57] ABSTRACT

An interior trim attachment apparatus for an automotive vehicle includes a fastener and a bezel secured together in a screw free manner by rotating one of the components relative to the other. An interior trim member is sandwiched between the fastener and bezel. In another aspect of the present invention, a sun visor is attached to either or both of the fastener and bezel components.

18 Claims, 6 Drawing Sheets

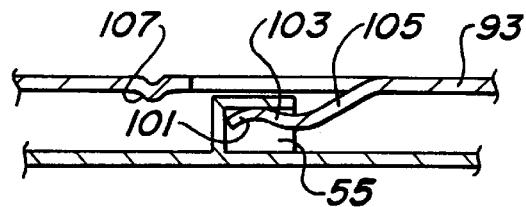
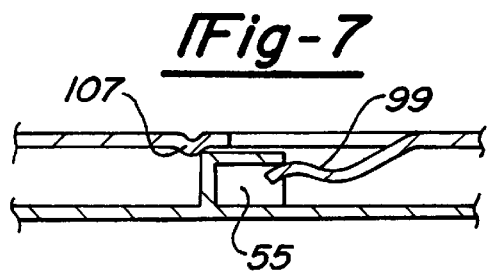
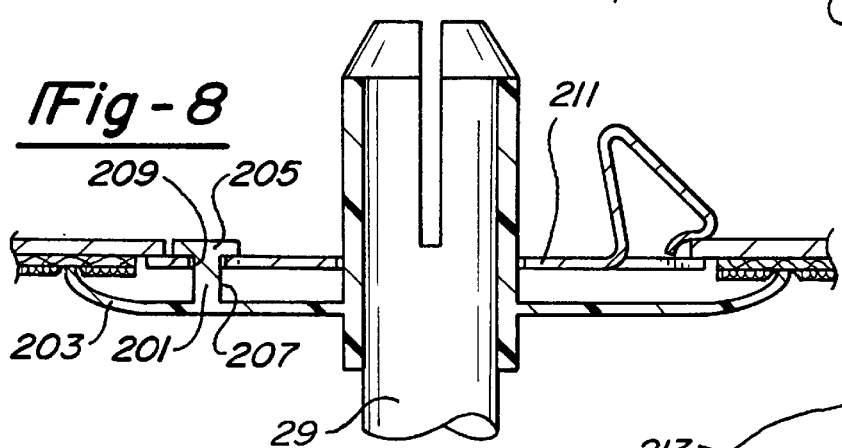
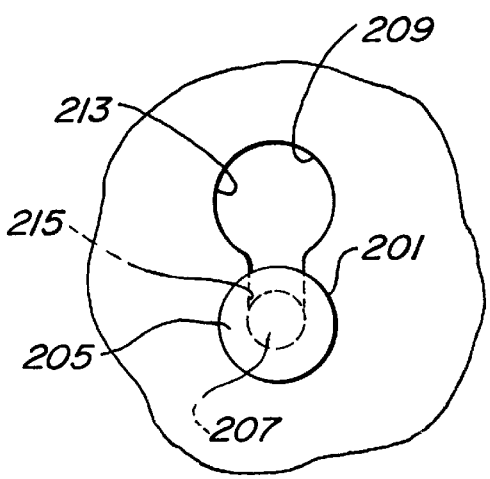
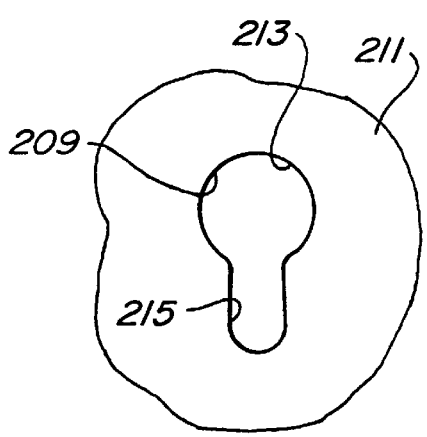
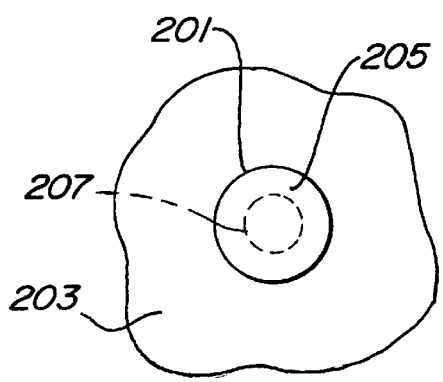

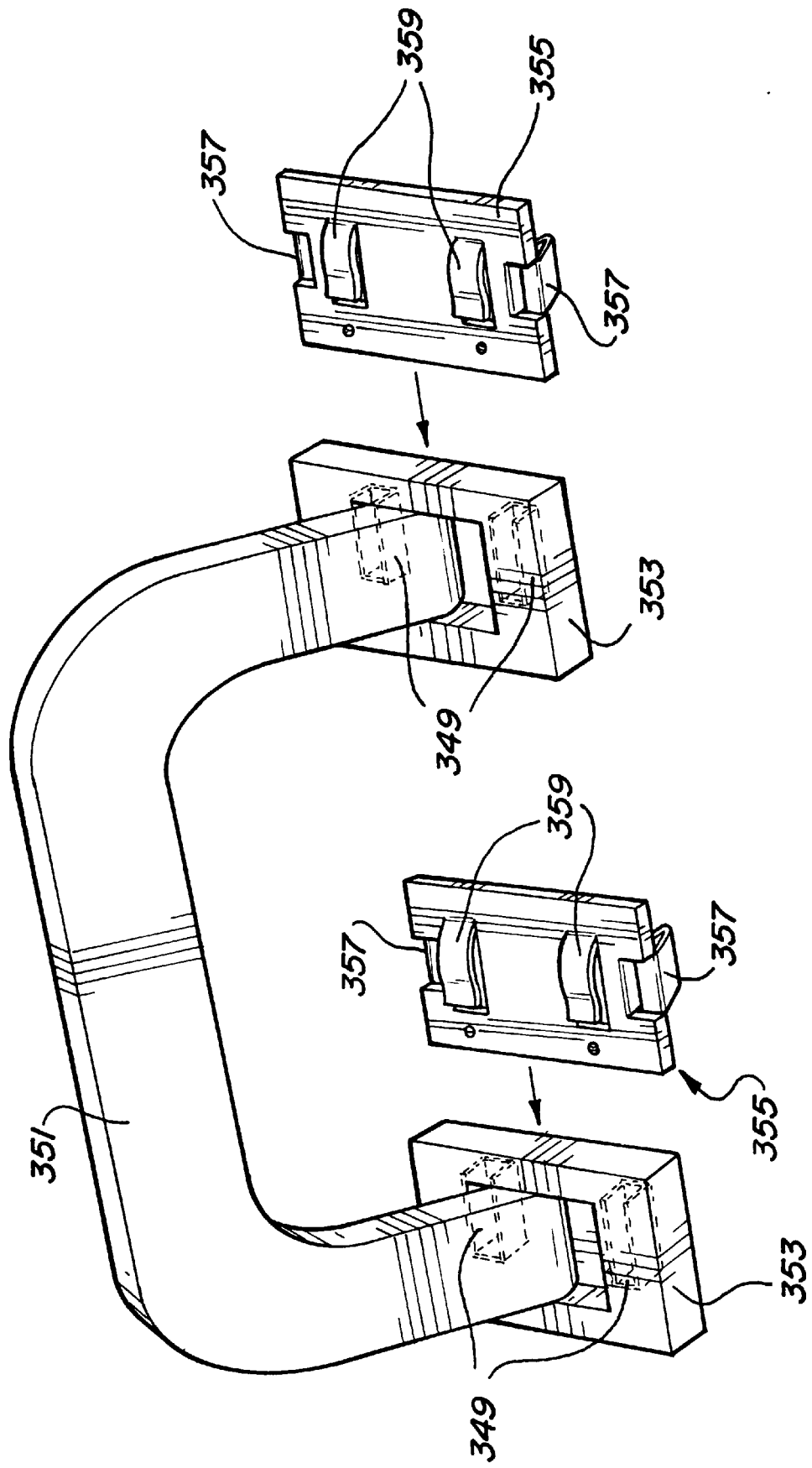

INTERIOR TRIM ATTACHMENT APPARATUS FOR AN AUTOMOTIVE VEHICLE

BACKGROUND OF THE INVENTION

This invention relates generally to attachment devices and more specifically to an interior trim attachment apparatus for an automotive vehicle.

Traditionally, automotive vehicle interior trim components are attached to sheet metal body panels by screws or barbed Christmas tree fasteners. Screws are problematic during installation on a quickly moving assembly line since the power screw drivers often inadvertently disengage the screw head and irreparably mar the adjacent trim panel or bezel. This leads to poor quality or costly removal and scrappage of the expensive trim panel. Furthermore, insertion of multiple screws is time consuming. Moreover, the installed screws are typically considered to be unattractive and are sometimes hidden by extraneous caps, especially for luxury vehicles. Christmas trees, on the other hand, are more aesthetically pleasing and easy to install but are rarely reusable once removed and are not suitable for withstanding loads within moving parts.

The recent modularization of interior trim systems, such as modular headliners, has allowed for the use of snap together parts which sandwich the headliner trim panels. These modular units have encouraged preassembly of various components prior to shipment and final assembly of the system into the automotive vehicle. This has significantly reduced cost while improving quality and aesthetic design flexibility. Notwithstanding, most of the modular sun visor attachments continue to use some screws either during preassembly or final assembly.

Examples of various conventional quick connect sun visors are disclosed in the following U.S. Pat. Nos. 5,544,927 entitled "Twist-In Visor Mount" which issued to Snyder et al. on Aug. 13, 1996; 5,499,854 entitled "Mounting Bracket Assembly for a Vehicle Sunshade and Method of Installing Same in a Vehicle" which issued to Crotty, III et al. on Mar. 19, 1996; 5,242,204 entitled "Visor Mount" which issued to Kitterman et al. on Sep. 7, 1993; 5,031,954 entitled "Mounting Bracket and Arm Assembly for a Vehicle Sunshade and Method of Installing Same in a Vehicle" which issued to Peterson et al. on Jul. 16, 1991; 4, 989,911 entitled "Snap-In Visor Mount" which issued to Van Order on Feb. 5, 1991; 4,913,484 entitled "Headliner and Sunshade Fastener" which issued to Dowd et al. on Apr. 3, 1990; and 4,729,590 entitled "Visor Rod Mount" which issued to Adams on Mar. 8, 1988.

SUMMARY OF THE INVENTION

In accordance with the present invention, the preferred embodiment of an interior trim attachment apparatus for an automotive vehicle includes a fastener and a bezel secured together in a screw free manner by rotating one of the components relative to the other. In a further aspect of the present invention, an interior trim member is sandwiched between the fastener and bezel. In another aspect of the present invention, at least one resilient leg projects from the fastener for engagement with a structural panel of the automotive vehicle. In still another aspect of the present invention, a sun visor is attached to either or both of the fastener and bezel components. A method of assembling the apparatus is also provided.

The interior trim attachment apparatus of the present invention is advantageous over traditional devices since the present invention allows for screw free fastening of the bezel, fastener and sun visor to each other and to the structural vehicle panel. Furthermore, the present invention allows for easy, quick and reusable preassembly and disassembly of the parts to each other and during final assembly to the vehicle. Another advantage is that the present invention reduces parts and labor while improving fastening strength and the aesthetic appearance. The fastening system is entirely hidden to the vehicle occupant. Additional advantages and features of the present invention will become apparent from the following description and appended claims, taken in conjunction with the accompanying drawings.

BRIEF DESCRIPTION OF THE DRAWINGS

FIG. 6 is a fragmentary cross sectional view, taken along line 6—6 of FIG. 2, showing the preferred embodiment interior trim attachment apparatus disposed in a fully engaged position;

FIG. 7 is a fragmentary cross sectional view, similar to that of FIG. 6, showing the preferred embodiment interior trim attachment apparatus disposed in a partially engaged position;

FIG. 8 is a cross sectional view, similar to that of FIG. 2, showing a first alternate embodiment interior trim attachment apparatus;

FIG. 9 is a fragmentary top elevational view showing the first alternate embodiment interior trim attachment apparatus;

FIG. 10 is a fragmentary top elevational view showing a fastener employed in the first alternate embodiment interior trim attachment apparatus;

FIG. 11 is a fragmentary top elevational view showing a bezel employed in the first alternate embodiment interior trim attachment apparatus;

FIG. 14 is a perspective view showing a fourth alternate embodiment interior trim attachment apparatus.

DETAILED DESCRIPTION OF THE PREFERRED EMBODIMENT

Figure 1:
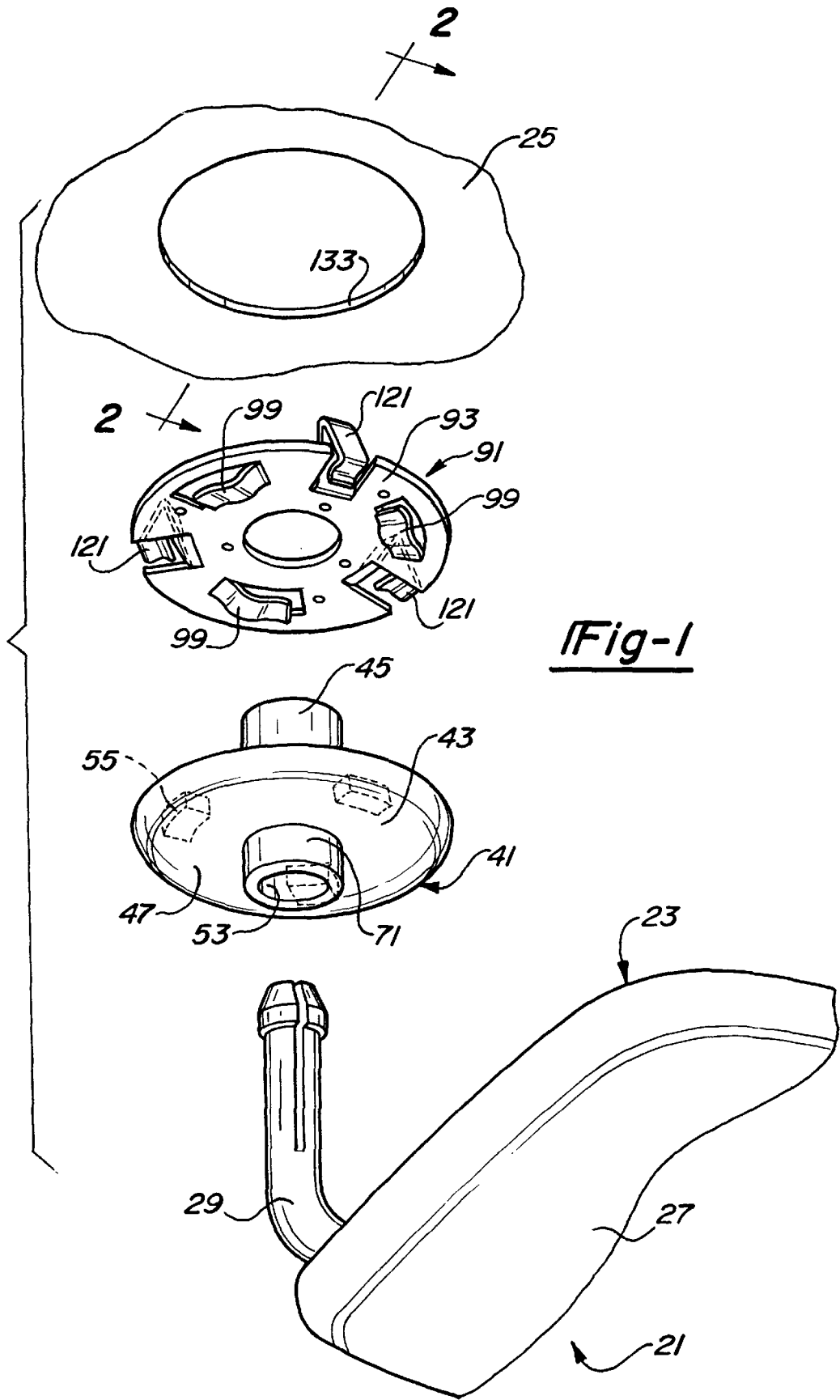
FIG. 1 is an exploded perspective view showing the preferred embodiment interior trim attachment apparatus of the present invention.
Figure 2:
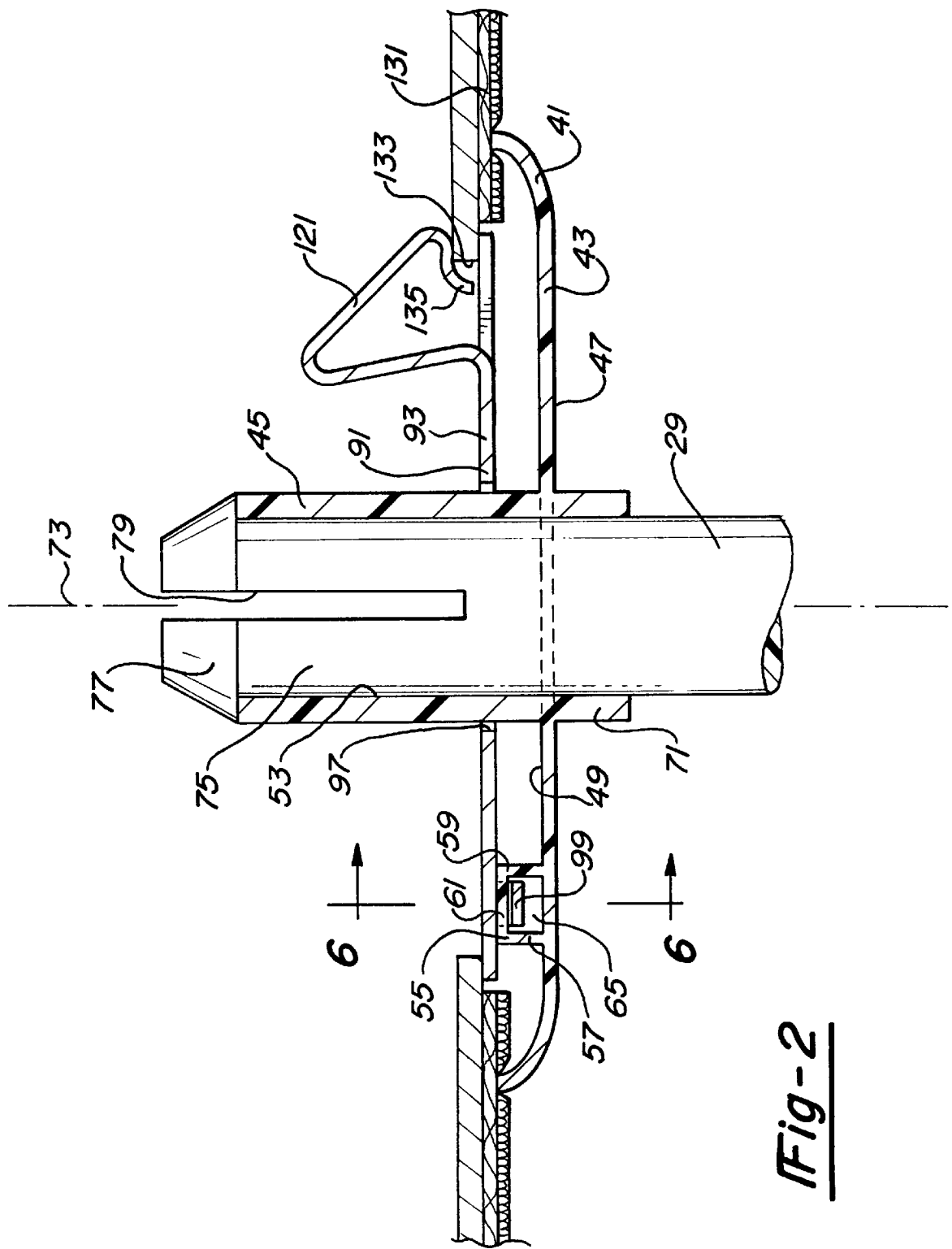
FIG. 2 is a cross sectional view, taken along line 2—2 of FIG. 1, showing the preferred embodiment interior trim attachment apparatus.
Figure 3:
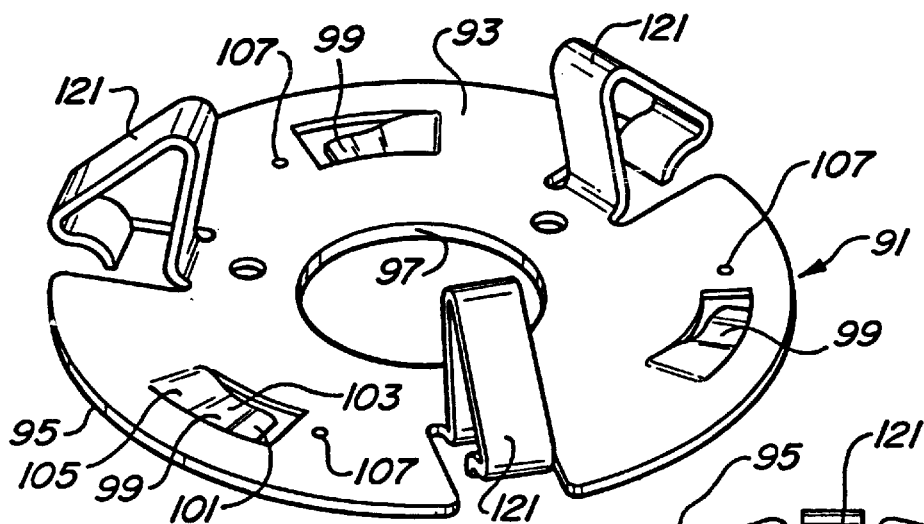
FIG. 3 is a perspective view showing a fastener employed in the preferred embodiment interior trim attachment apparatus.
Figure 4:
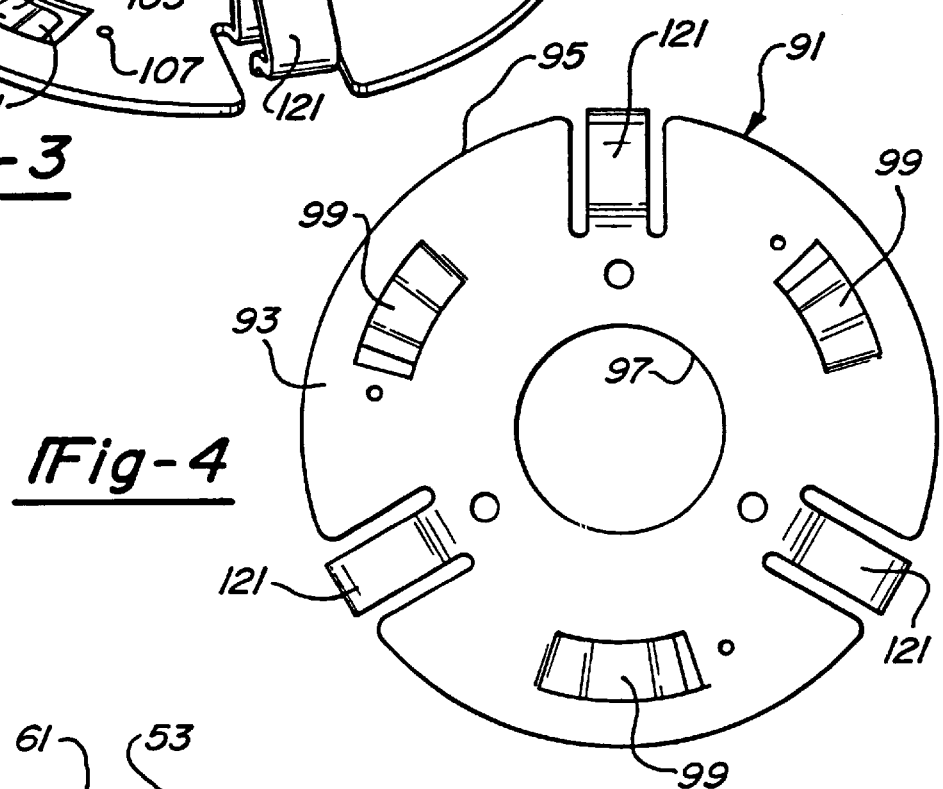
FIG. 4 is a top elevational view showing the fastener employed in the preferred embodiment interior trim attachment apparatus.
Figure 5:
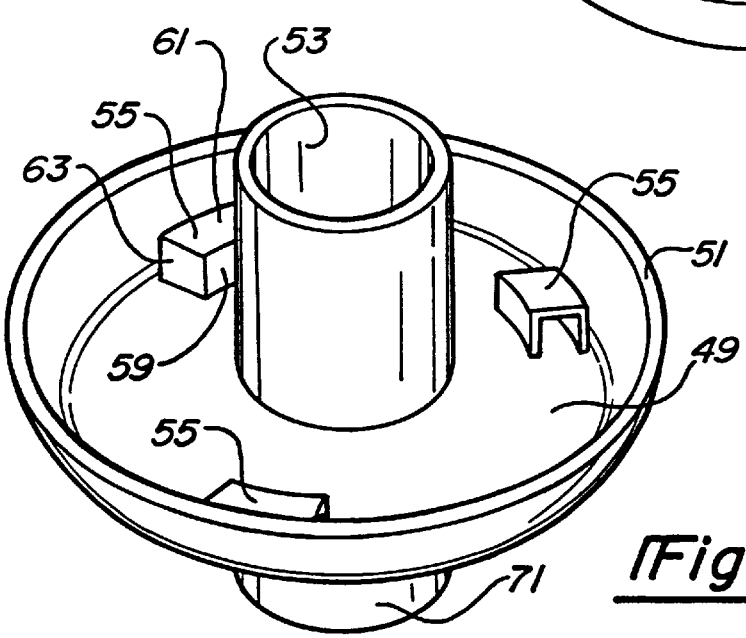
FIG. 5 is a perspective view showing a bezel employed in the preferred embodiment interior trim attachment apparatus.

Referring to FIGS. 1–5, the preferred embodiment of an interior trim attachment apparatus 21 of the present invention is used to attach a sun visor 23 to a sheet metal structural body panel, such as a front header panel 25, of an automotive vehicle. Sun visor 23 has a blade 27 made from a cloth or vinyl covered substrate consisting of plastic, foam and pressboard, or foam with a wire frame. A right angled steel elbow 29 of sun visor 23 projects from an outboard edge of blade 27. Blade 27 can pivot between a generally horizontal stowed position and a generally vertical functional position relative to elbow 29. Elbow 29 is also allowed to rotate with blade 27 from a position parallel to a windshield, to a position parallel to a side window.

A bezel 41 has a main body portion 43 and an annular bearing portion 45. A face surface 47 of bezel 41 is aesthetically attractive and may be provided with a patterned texture. An opposite back surface 49 of bezel 41 is hidden from view once installed in the automotive vehicle. Bezel 41 further has a generally circular peripheral edge 51 and a circular central orifice 53. Three box-like dog houses 55 are equally spaced away from each other and extend from back surface 49 of bezel 41. Each dog house 55 has a pair of generally parallel side wall sections 57 and 59 joined by a top wall section 61 and a back wall section 63. Each dog house 55 has an open end for allowing access to an internal cavity 65. A structure 71 projecting from face surface 47 of bezel 41 may have a circular exterior shape or may have a set of wrench receiving flats for engagement with a wrench to facilitate rotation of bezel 41 as will be described in more detail hereinafter. Bezel 41 is preferably injection molded from an engineering grade plastic.

Sun visor elbow 29 is concentrically disposed in bearing 45 of bezel 41 and has a pivot axis 73. Elbow 29 may be retained to bearing 45 of bezel 41 by way of a pair of bifurcated and somewhat flexible legs 75, with barbed ends 77, separated by a through slot 79. Alternately, a compression spring and washer arrangement, or a key-holed and insert molded polymeric torque fitting construction can be used to secure elbow 29 to bezel 41.

An approximately b 1millimeter thick, hardened spring steel clip fastener 91 has a generally flat base 93 with a circular periphery 95 and a circular central aperture 97. Three receptacles 99 are equally spaced around base 93 and are defined by an undulating depressed flange offset from the flat plane of base 93. Each flange has a downwardly angled lead-in portion 101, an S-shaped middle portion 103 and an upwardly angled trailing portion 105 joined to base 93. Three detent bumps 107 are equally spaced from each other and are disposed adjacent to each receptacle 99. Furthermore, three barb-like snap legs 121 have a generally triangular shape with one corner pointing upwardly away from bezel 41 while another corner points outwardly away from pivot axis 73. Fastener 91 is preferably made in progressive stamping dies and punching operations.

The interior trim attachment apparatus 21 is assembled together as follows: First, elbow 29 of sun visor 23 is inserted through and secured to bezel 41. Second, bezel 41 is placed against an interior appearance surface of a headliner interior trim panel 131 while fastener 91 is placed against a back surface of headliner 131. Thus, headliner 131 is sandwiched or compressibly trapped between bezel 41 and fastener 91. Headliner 131 is preferably made from a compression molded fiberglass or resinate foam substrate with an adhesively bonded covering material such as fabric or vinyl.

Third, either bezel 41 or fastener 91 is rotated about centerline 73 relative to the other such that each flange of receptacle 99 resiliently engages against the inside of the corresponding dog house 55, as can be observed in FIG. 6. Either the bezel or fastener is rotated less than 360° in order to firmly engage the dog house with the receptacle flange. FIG. 7 illustrates the use of detent bumps 107 to deter inadvertent disengagement of dog houses 55 from the flanges of receptacles 99 during normal automotive vehicle vibration or the like. Thus, a superior disengagement force must be applied to rotate each dog house 55 past the corresponding detent bump 107 by use of a wrench or the like.

Accordingly, once bezel 41 is fully engaged with fastener 91, sun visor 23 is securely retained to headliner 131 in a modularized manner. This allows for stationary, off-line preassembly of the modular headliner unit which improves quality and reduces cost. Finally, once the modular headliner is inserted into the automotive vehicle, the assembly personnel simply push linearly upward on elbow 29 or bezel 41 to engage resilient legs 121 of fastener 91 with body panel 25 adjacent to a circular hole 133 therein. During this engagement process, each leg 121 is resiliently compressed or collapsed while it is being inserted into hole 133. Each leg 121 then at least partially returns to its nominal state due to the inherent spring action of the spring steel part. Fastener 91 can be removed from body panel 25 for service by first rotatably removing bezel 41 and then manually collapsing each leg 121 by engaging a screwdriver blade between hole 133 of body panel 25 and the adjacent tang 135 of each leg 121. Hence, a totally screw free attachment of bezel 41 to fastener 91 is achieved while also providing for an entirely screw free and snap-fit fastening of fastener 91 to body panel 25.

A first alternate embodiment of the interior trim attachment apparatus of the present invention can be observed in FIGS. 8–11. In this embodiment, three mushroom-shaped members 201 internally project from a bezel 203. Each mushroom-shaped member 201 has a generally T cross sectional shape defined by a head section 205 and a pedestal section 207. A keyhole receptacle 209 of a fastener 211 corresponds with each mushroom-shaped member 201. Thus, to secure bezel 203 to fastener 211, each head section 205 is vertically pushed through an enlarged circular portion 213 of the coincidental keyhole receptacle 209. Next, bezel 203 is rotated relative to fastener 211, or vice versa, such that each pedestal section 207 is slid into an elongated narrow portion 215 of each keyhole receptacle 209, whereby each head section 205 overlaps each narrow portion 215 for providing a secure attachment.

Figure 12:
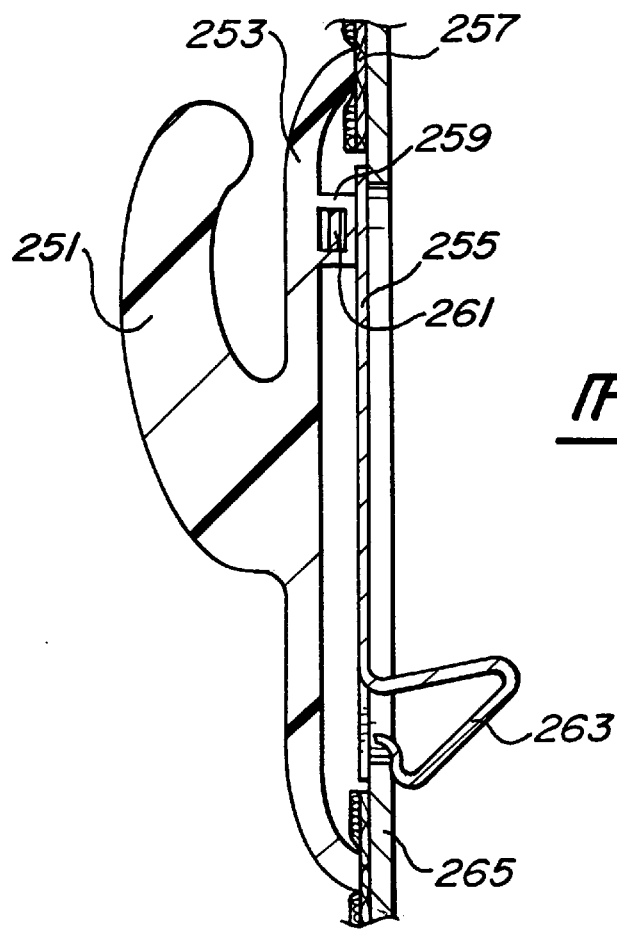
FIG. 12 is a cross sectional view showing a second alternate embodiment interior trim attachment apparatus.

A second alternate embodiment of the present invention is shown in FIG. 12. In this exemplary embodiment, the modularized, screw free and quick connect aspects of the present invention are employed in combination with a coathook interior trim member. A coathook 251 is integrally injection molded as part of bezel 253. A fastener 255 sandwiches a headliner 257 between itself and bezel 253 when it is attached to bezel 253 by use of multiple dog houses 259 and receptacle flanges 261, similar to the arrangement employed in the preferred embodiment. A set of resilient snap legs 263 are secured to a side rail body panel 265. Bezel 253 has a generally circular periphery to promote its rotation for engaging fastener 255.

Figure 13:
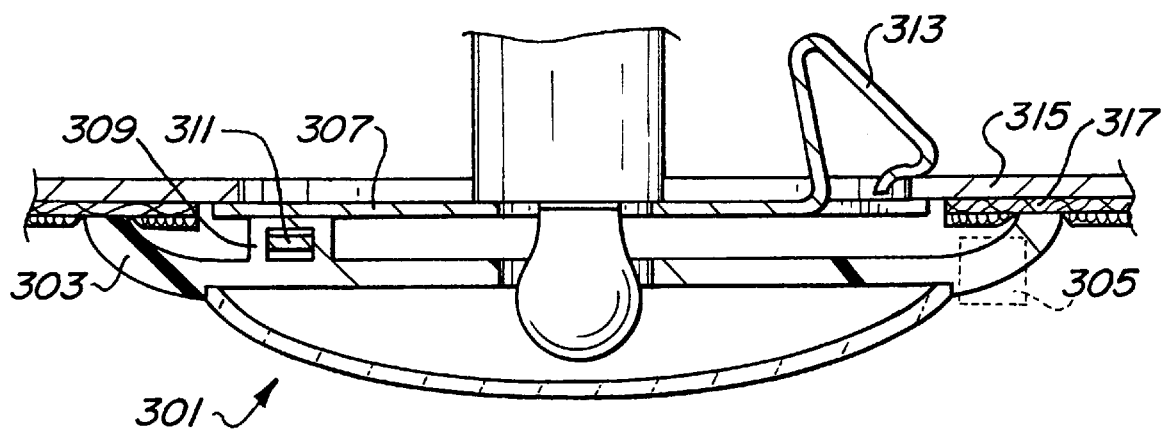
FIG. 13 is a cross sectional view showing a third alternate embodiment interior trim attachment apparatus.

A third alternate embodiment of the interior trim attachment apparatus of the present invention can be observed in FIG. 13. In this embodiment, a lamp 301 is attached to an injection molded bezel 303. A rocker or push-push type switch 305 is also attached to bezel 303. Bezel 303 is secured to a fastener 307 in a screw free rotational manner by engagement of three dog houses 309 with receptacle flanges 311 as has been previously described herein with regard to the preferred embodiment. Similarly, three snap legs 313 are used to retain bezel 303 and lamp 301 to a sheet metal body panel, door trim panel, instrument panel, quarter trim panel or the like, all of which are designated as reference number 315. Such a panel 315 may be covered by a headliner, or vinyl covering 317.

While various embodiments of the interior trim attachment apparatus have been disclosed, it will be appreciated that other aspects may be employed without departing from the present invention. For example, an electrical switch and bezel combination, without a corresponding lamp, can be attached to a fastener by use of a rotational attachment means. Furthermore, a greater or fewer number of fastener snap legs, and dog house/receptacle attachments may be used as long as screw free and rotational fastening is achieved. Moreover, the present invention can also be used for a sun visor center support. It is also envisioned that a bezel with dog houses 349 may be linearly slid (rather than rotated) relative to a retainer with receptacle flanges so as to fasten together the parts in a screw-free manner while sandwiching a substrate therebetween; as is shown in FIG. 14, this is especially advantageous for parts like a pivotable assist handle 351 mounted to a pair of aesthetic bezels 353 which do not readily allow rotation. In this embodiment, each of a pair of metal clip fasteners 355 have a pair of opposed snap legs 357 and a pair of S-shaped receptacles 359. Various materials have been disclosed in an exemplary fashion, however, other materials may of course be employed. It is intended by the following claims to cover these and any other departures from the disclosed embodiments which fall within the true spirit of this invention.

The invention claimed is:

1. An attachment apparatus for an automotive vehicle having a structural body panel, said apparatus comprising:
   a fastener component having a receptacle and at least one resilient leg depending from a base;
   a bezel component having a back surface and a face surface, said back surface being substantially hidden when installed and said face surface being substantially visible when installed an engagement member of said bezel component having a first section extending from said back surface and a second section depending at an offset angle from said first section; and
   said bezel component hiding said fastener component from view when installed in said vehicle;
   wherein said second section is inserted into said receptacle when one of said components is rotated relative to the other of said components thereby fastening said components together.

2. The apparatus of claim 1 further comprising an interior trim member being secured to at least one of said components.

3. The apparatus of claim 2 wherein the structural panel of the automotive vehicle is a sheet metal panel having at least one hole for receiving said at least one resilient leg of said fastener component and a portion of said interior trim member.

4. The apparatus of claim 3 wherein said interior trim member is a sun visor including a pivotable elbow extending from said bezel component.

5. The apparatus of claim 4 wherein said portion of said sun visor has compressible barbs attached to said bezel component.

6. The apparatus of claim 2 wherein said interior trim member is a coat hook.

7. The apparatus of claim 2 wherein said interior trim member is a sun visor fastener.

8. The apparatus of claim 2 wherein said interior trim member is a lamp.

9. The apparatus of claim 2 wherein said interior trim member is an electrical switch.

10. The apparatus of claim 1 wherein said bezel component is secured to said fastener component in a tool free manner.

11. The apparatus of claim 10 wherein said fastener includes at least three resilient legs having barbed configurations removably engaging the structural body panel of the automotive vehicle in a snap fit manner.

12. The apparatus of claim 1 wherein said fastener component is preassembled to said bezel component prior to engagement of said fastener component to the structural body panel of said automotive vehicle.

13. The apparatus of claim 12 further comprising a covered substrate of an interior trim panel, said base of said fastener component having a central aperture, said bezel component having a substantially circular periphery and a central orifice, said orifice substantially aligning with said aperture, a section of said substrate being sandwiched between said bezel component and said fastener component.

14. The apparatus of claim 1 wherein said sections of said bezel component are part of a box-like dog house having an open side.

15. The apparatus of claim 1 wherein said receptacle of said fastener component is a depressed flange offset from a plane of said base.

16. An attachment apparatus for an automotive vehicle, said apparatus comprising:
   a first component having at least two snap-fit legs integrally formed with a base, at least a pair of receptacles disposed on said base;
   a second component having at least a pair of engagement members projecting from a body;
   a trim panel having a portion located between said components, said trim panel having an edge defining a hole; and
   a sun visor attached to at least one of said components prior to assembly of said components into the automotive vehicle;
   said second component substantially hiding said edge when installed in said vehicle;
   wherein said engagement members are attached to said receptacles by rotation of one of said components in relation to the other of said components, said first component is fastenable to the automotive vehicle in a tool free manner.

17. A method of assembling an automotive interior trim system, the method comprising:
   (a) stamping at least one receptacle in a fastener component;
   (b) positioning a bezel component on one side of an interior trim member;
   (c) positioning said fastener component on an opposite side of said interior trim member which is substantially hidden when installed;
   (d) securing at least one engagement member of said bezel component to said at least one receptacle of said fastener component by rotating one of said components less than 360° relative to the other of said components; and
   (e) securing said bezel component to said fastener component and both components to said interior trim member in a substantially single motion.

18. The method of claim 17 further comprising:
   (a) engaging at least two box-like dog houses with at least two flanges projecting from a base of said fastener component, said at least one receptacle defining said dog houses; and
   (b) deterring disengagable rotation of said dog houses from said flanges by abutting at least one of said dog houses against a detent formation of said fastener component.

\* \* \* \* \*